US011068451B2

(12) United States Patent
Leuchtenburg et al.

(10) Patent No.: US 11,068,451 B2
(45) Date of Patent: Jul. 20, 2021

(54) DATABASE COLUMN REFRESH VIA REPLACEMENT

(71) Applicant: EntIT Software LLC, Sunnyvale, CA (US)

(72) Inventors: Michael Leuchtenburg, Cambridge, MA (US); Yuanzhe Bei, Cambridge, MA (US); Charles Edward Bear, Cambridge, MA (US); Nga Tran, Andover, MA (US)

(73) Assignee: MICRO FOCUS LLC, Santa Clara, CA (US)

(*) Notice: Subject to any disclaimer, the term of this patent is extended or adjusted under 35 U.S.C. 154(b) by 462 days.

(21) Appl. No.: 15/688,144

(22) Filed: Aug. 28, 2017

(65) Prior Publication Data

US 2019/0065538 A1 Feb. 28, 2019

(51) Int. Cl.
*G06F 16/22* (2019.01)
*G06F 16/23* (2019.01)
*G06F 16/25* (2019.01)
*G06F 16/2455* (2019.01)

(52) U.S. Cl.
CPC ............ *G06F 16/221* (2019.01); *G06F 16/23* (2019.01); *G06F 16/2455* (2019.01); *G06F 16/2456* (2019.01); *G06F 16/258* (2019.01)

(58) Field of Classification Search
CPC .... G06F 16/221; G06F 16/23; G06F 16/2455; G06F 16/2456; G06F 16/258; G06F 16/25
USPC ........................................................ 707/812
See application file for complete search history.

(56) References Cited

U.S. PATENT DOCUMENTS

| | | | |
|---|---|---|---|
| 6,289,335 B1* | 9/2001 | Downing | G06F 16/2393 707/769 |
| 7,174,342 B1* | 2/2007 | Scheurich | G06Q 10/10 |
| 7,739,223 B2* | 6/2010 | Vaschillo | G06F 16/84 |
| 8,996,502 B2 | 3/2015 | Folkert et al. | |
| 9,111,012 B2* | 8/2015 | Fu | G06F 16/24578 |
| 9,606,921 B2* | 3/2017 | Kamp | G06F 16/221 |
| 9,619,502 B2* | 4/2017 | Klauke | G06F 16/2282 |
| 9,626,421 B2 | 4/2017 | Plattner et al. | |
| 2006/0047622 A1* | 3/2006 | Folkert | G06F 16/24535 |
| 2011/0137875 A1 | 6/2011 | Ziauddin et al. | |
| 2014/0280029 A1* | 9/2014 | Ding | G06F 16/24539 707/717 |

OTHER PUBLICATIONS

Golba, Rick. "Row Store and Column Store Databases". Published Dec. 14, 2016. Accessed Nov. 26, 2019 from <https://www.percona.com/blog/2016/12/14/row-store-and-column-store-databases/> (Year: 2016).*

(Continued)

*Primary Examiner* — Robert W Beausoliel, Jr.
*Assistant Examiner* — Arthur Ganger (57) ABSTRACT

According to an example, a system may receive a refresh column command for a column-oriented database. The refresh column command may identify a table in the column-oriented database and a denormalized column in the table. The system may determine column definitions for the column, generate a query to populate values from a data source associated with the column into the column based on the column definitions, and may execute the query to replace entire set of existing column values with the data source values.

20 Claims, 5 Drawing Sheets

(56) References Cited

OTHER PUBLICATIONS

Root, Dick, "Denormalization and the Rules of Reconstruction", Oct. 1, 2000, The Data Administration Newsletter, pp. 5. http://tdan.com/denormalization-and-the-rules-of-reconstruction/4887.

* cited by examiner

DATABASE COLUMN REFRESH VIA REPLACEMENT

BACKGROUND

Column-oriented, relational database systems store data in columns instead of rows. Column-oriented databases can improve the speed of read-intensive workloads by reducing disk input/output (I/O) operations compared to row-based storage.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an example of the present disclosure denormalized column values may be refreshed on-demand by a refresh columns command identifying a table in a column-oriented database and a denormalized column or columns in this table. Refresh-via-replacement is a procedure for executing the refresh columns command on one or more columns. The refresh-via-replacement procedure executes a refresh column plan to populate up-to-date values into the denormalized target columns. Once the refresh column plan is executed, the existing files for the target columns are internally replaced by the new files containing the up-to-date values.

The refresh-via-replacement procedure may be also applied to appending new denormalized columns to a table of a column-oriented database. For example, the refresh-via-replacement procedure may be applied to add multiple columns with denormalized values to an existing table by appending the new columns populated with data to the table.

For example, to process a query, a row store reads all columns in all of the tables named in the query, regardless of how wide the tables might be or how many columns are actually needed. A column store with a query-specific projection can execute the query by reading a subset of the columns. A column-oriented database may include a column of denormalized values. The denormalized values can be either automatically populated and filled during data loading, or be refreshed on-demand. For the denormalized columns the "refresh columns" operations are usually applied to all rows. In such scenarios, "via-update" operation needs to mark the entire table as deleted and insert new rows with updated values, which is even more expensive than dropping and re-creating the entire table.

According to an example of the present disclosure, refresh-via-replacement procedures and other procedures described herein may be applied to a column-oriented database. A column-oriented database management system (DBMS) or columnar database management system is a DBMS that stores data tables by column rather than by row. Practical use of a column store versus a row store has some differences in the relational DBMS environment. Both columnar and row databases may use traditional database query languages such as Structured Query Language (SQL) to load data and execute queries. Both row and columnar databases may be used to serve data for common extract, transform, data load and data visualization tools. However, by storing data in columns rather than rows, the database may access the data it needs more precisely to answer a query rather than scanning and discarding unwanted data in rows. In column-oriented databases, query performance is often increased compared to row-oriented databases, particularly on very large data sets.

Table 1 below shows a simple example of a row-oriented database table with 4 columns and 3 rows:

TABLE 1

| ID | Last | First | Bonus |
|---|---|---|---|
| 1 | Doe | John | 8000 |
| 2 | Smith | Jane | 4000 |
| 3 | Beck | Sam | 1000 |

In the row-oriented database management system, the data may be stored like this: 1, Doe, John, 8000; 2, Smith, Jane, 4000; 3, Beck, Sam, 1000. In a column-oriented database management system, the data may be stored like this:1, 2, 3; Doe, Smith, Beck; John, Jane, Sam; 8000, 4000, 1000. For example, a value "1, 2, 3" is stored in a file for a first column in the column-oriented database management system; a value "Doe, Smith, Beck" is stored in a second file for a second column in the column-oriented database management system; a value "John, Jane, Sam" is stored in a third file for a third column in the column-oriented database management system; and a value "8000, 4000, 1000" is stored in a fourth file for a fourth column in the column-oriented database management system.

Denormalized columns are database columns that are not directly related to other columns via a primary key (Pk). The denormalized columns may be related to other columns of the same table via a foreign key (Fk). According to examples of present disclosure, denormalized columns may be refreshed by execution of a refresh columns command which may specify one or multiple columns of a table to refresh. A refresh-via-replacement procedure may be executed responsive to receiving a refresh columns command to perform the replacement of the files associated with the columns. The denormalized columns may improve performance of a query operation. The denormalized columns may be created for most frequently used columns (for example, First Name, Last Name, etc.). The denormalized columns may be created in an intersection table created by an SQL join of two or more tables. Column definitions for the column may define a data type of values to be stored in the column. In one example, the column definitions may include a transformation (encoding) performed on the values prior to being stored in the column, such as data conversions, truncations, masking, encryption, etc. The column definitions may include a sort order of values.

Figure 1:
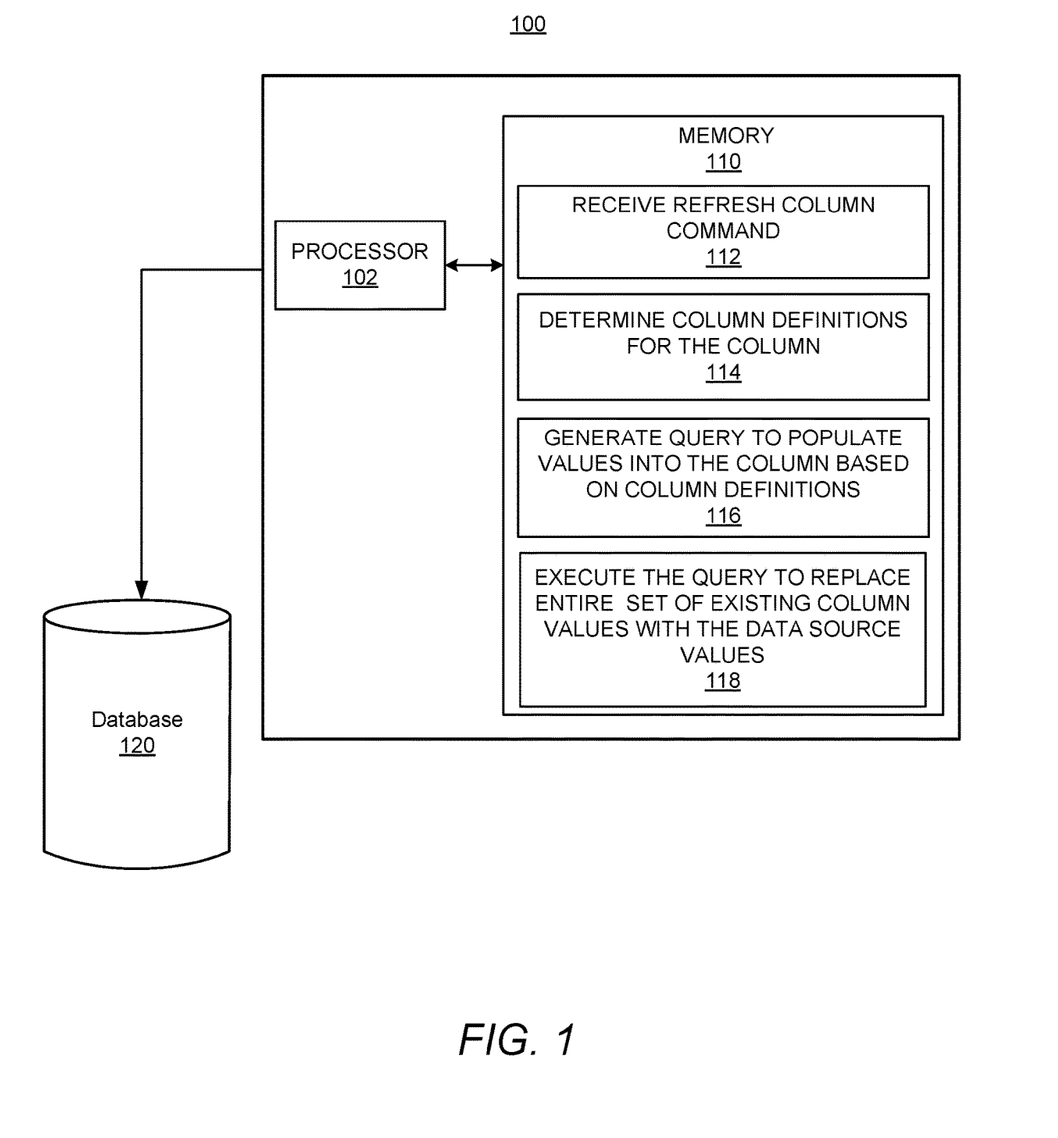
FIG. 1 shows a block diagram of an example database engine.

With reference first to FIG. 1, there is shown a block diagram of an example system 100 that may perform a column refresh-via-replacement procedure, according to an example of the present application. It should be understood that the system 100 depicted in FIG. 1 may include additional components and that some of the components described herein may be removed and/or modified without departing from a scope of the system 100 disclosed herein.

In one example, the system 100 may include a processor 102 that may control operations of the system 100. The processor 102 may be a semiconductor-based microprocessor, a central processing unit (CPU), an application specific integrated circuit (ASIC), a field-programmable gate array (FPGA), and/or other hardware device.

The system 100 may also include a memory 110 that may have stored thereon machine-readable instructions 112-118 (which may also be termed computer readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals. The system 100 may be connected to a database 120.

The processor 102 may fetch, decode, and execute the instructions 112 to receive a refresh column command for a column-oriented database. The refresh column command may identify a table in the column-oriented database and a denormalized column in the table. The processor 102 may fetch, decode, and execute the instructions 114 to determine column definitions for the column. The processor 102 may fetch, decode, and execute the instructions 116 to generate a query to populate values from a data source associated with the column into the column based on the column definitions. The processor 102 may fetch, decode, and execute the instructions 118 to execute the query to replace an entire data set of the column with the values. In one example, the system 100 may have access to a distributed column-oriented database.

An example of a refresh-via-replacement is now described for a column-oriented database management system. If, using the above example, a bonus amount value "4000" changes to "5000" in a column-oriented database 120, the entire column may need to be refreshed, because the column references all the values for the bonus amounts stored in the files. A file may store the data for the column and may be identified via column meta data. Thus, the file is refreshed to include values "8000, 5000, 1000." This way, instead of replacing one value of "5000" in the "new" file, the entire file is replaced and the "old" file containing the value of "8000, 4000, 1000" may be deleted. Column metadata, such as a link pointing to the "old" file on the disk, may be dropped. Thus, the entire set of existing values of the original column may be replaced by a new one. Using the above example, the entire set of existing column values "8000, 4000, 1000;" may be replaced with the values "8000, 5000, 1000". The "new" file becomes visible to queries to the table.

Figure 2:
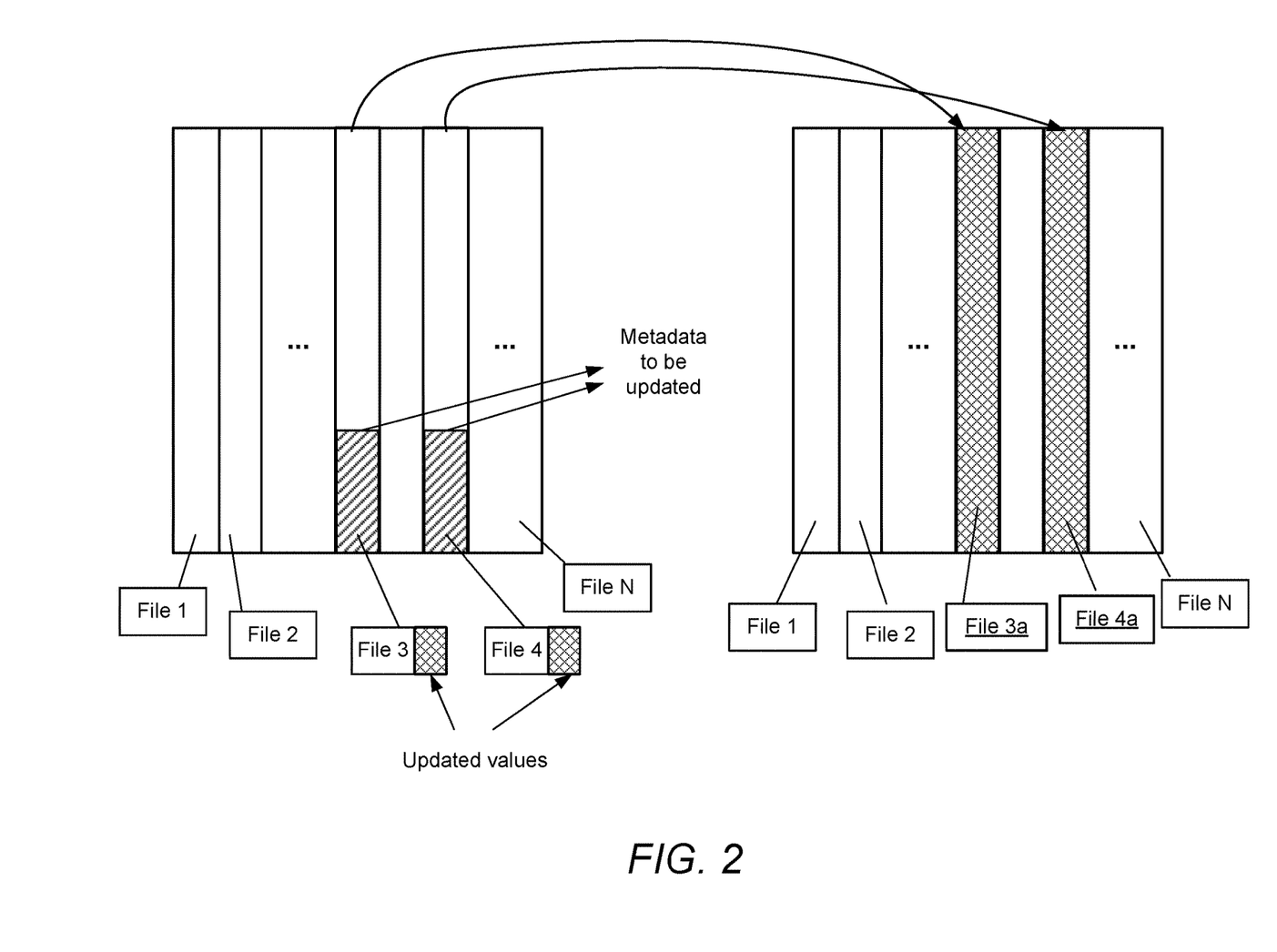
FIG. 2 shows a diagram of an example of refresh via replacement procedure.

Turning to FIG. 2, there is shown a diagram of an example of a refresh-via-replacement procedure. Files 1-N (on the left) may contain column values in a column-oriented database. The files 1-N may reside on the disk and may be referenced by column metadata. In this example, File 3 and File 4 referenced by corresponding column metadata (depicted by hash marks on the left) contain column values that have been updated. These new column values may be written into new files File 3a and File 4a respectively by a refresh-via-replacement procedure described in more detail below. Subsequently, the files File 3 and File 4 may be replaced by the new files File 3a and File 4a as shown by the arrows at the top. The procedure may link the files File 3a and File 4a containing the new column values to column storage metadata of the columns on the right being refreshed (see hash marked columns on the right). The procedure may drop the metadata links to the old files (File 3 and File 4) containing the existing column values. After a transaction is committed, new column metadata (links) may become visible to future queries. Thus, when a query is executed on the table containing the refreshed column(s) on the right, the query may read values from the new files 3a and 4a referenced by the columns' metadata pointing to the locations of the new files 3a and 4a on the disk. After the transaction is committed, the old files X and Y may be deleted.

Figure 3:
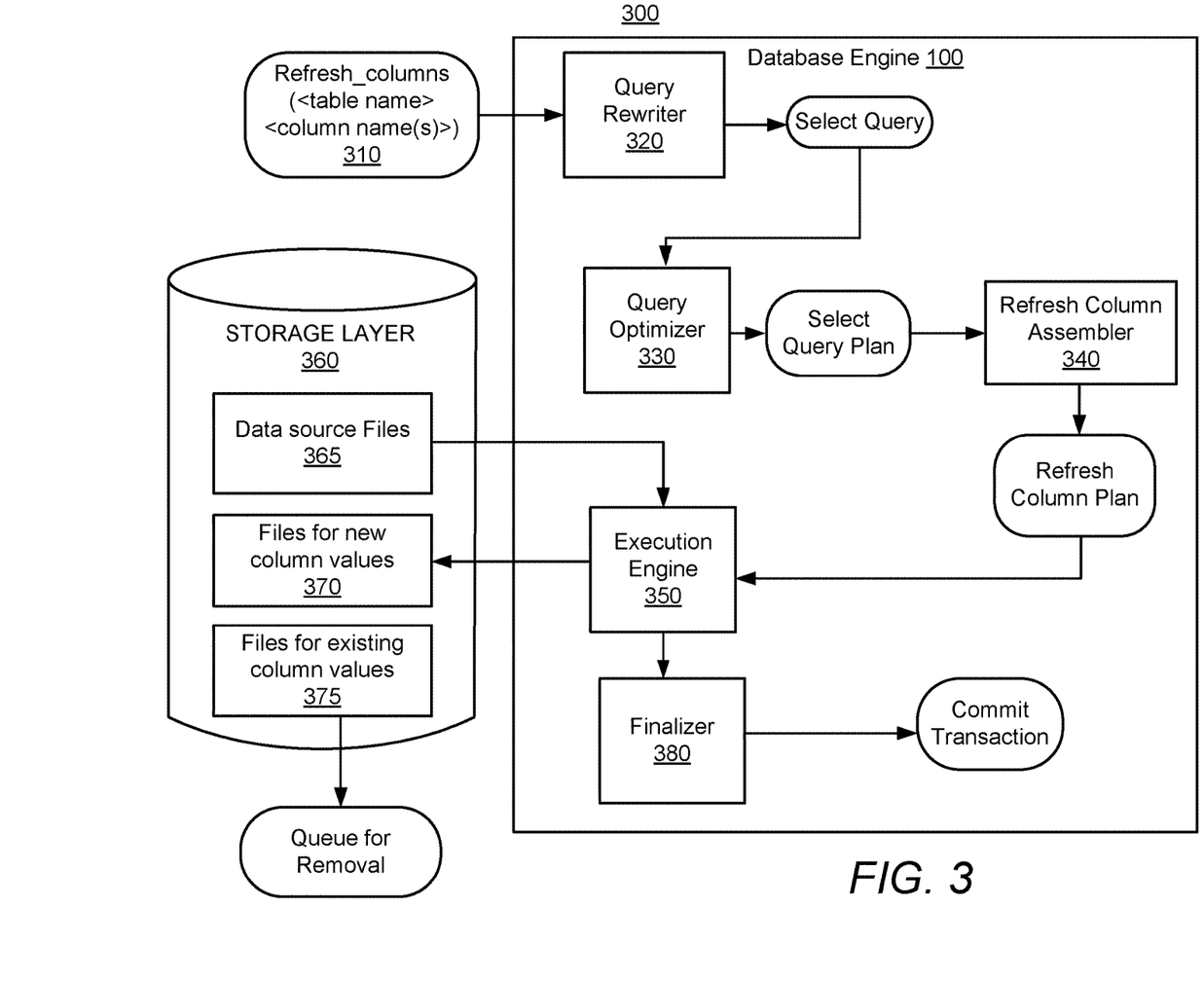
FIG. 3 shows components and workflow of an example database engine.

With reference first to FIG. 3, there is shown a block diagram of example components and workflow 300 of an example system 100. The system 100 may receive a refresh columns command 310. The command 310 identifies a table of a column-oriented database and a denormalized column or denormalized columns to be refreshed in this table. Query rewriter 320 may process the command 310 and may retrieve table metadata for the table identified by the command 310. Then, the query rewriter 320 may generate a select query to populate the denormalized column(s) based on the table metadata. The table metadata may include column definitions of the column(s) to be refreshed. Query optimizer 330 may receive the query and may generate a select query plan based on storage layout metadata of the modified columns to be read by the query. In one example, some of the columns to be refreshed may not have any modified files. However, these columns may be refreshed as part of an automatic scheduled columns update procedure. Using the example from FIG. 2, the columns referencing files 1, 2 . . . N may be replaced by columns referencing the files on the right even if none of their values are modified. The select query plan may define how source data may be scanned and how data sources such as tables may be joined (for example, the order of the joins and which join procedure to use).

Refresh column assembler 340 may process the select query plan and may generate a refresh column plan based on storage layout metadata of the columns to be refreshed identified by the command 310. The refresh column plan may include an executable script that may write new column value streams produced by the select query to files 370 while maintaining the same storage layout of the columns to be refreshed. The refresh column plan may include scan tables, join tables, re-segment data, sort data and write operations. A storage layer 360 may reside in multiple local segmentations or in a global segmentation. The storage layout may define values sort order and encodings. In one example, the refresh column plan may be distributed across a cluster of nodes. Distributed execution engine 350 may execute the refresh column plan on every node of the cluster. Execution of the refresh column plan may cause reading of data source files 365 from storage layer 360. The files 365 are the files that are selected based on the select query, which may be included in the script of the refresh column plan. The execution of the refresh column plan may cause for new column values to be generated and written into files 370 (the new files) residing on the storage layer 360.

Finalizer 380 may link the files 370 containing the new column values to column storage metadata of the column(s) to be refreshed. The finalizer 380 may drop the links to files 375 (the old files) containing the existing column values. The system 100 may commit a transaction performed by the execution of the refresh column plan. After the transaction is committed, new column metadata may become visible to future queries. In other words, when a query is executed on the table containing the refreshed column(s), the query may read values from the new files 370 that may be referenced by the new column metadata such as, for example, pointers indicating location of the new files on the disk. After the transaction is committed, the old files 375 may be placed in a queue for removal.

In one example, data sources provide the source values that are read directly from existing data source files residing on the disk. A select query plan may assemble the source values (from multiple tables and multiple sources) and compute new column values to be used to populate a target column. Thus, the new values are generated from the source values originated from the data source files. For example, in a table called "Customer," each row may have a column called "Address." The value of the "Address" column may be a combination of street number/name, city, state, postal code, etc. Each of these itemized strings may be stored in their respective dimension tables, and the "Customer" table may keep foreign keys associated with these dimension tables. Every time a user executes command on the column "Customer.Address," the select query plan may perform the following operations:

1) scan the source values from all of the dimension tables (city, state, etc.); 2) join the source values with "Customer" table through foreign keys (FKs); and 3) combine the items into a string using the address string template (number/name, city, state, postal code, etc.). The select query plan may output a resulting address string (new values). The new values may be different from the source values, because they may be computed on the fly from the source values. The new values may be written into new files of the target column.

According to examples of the present disclosure, a refresh plan may be generated based on the select query plan. In one example, the most optimal, i.e., "best" refresh plan may be generated. Since there may be multiple data sources and each data source may have multiple data storage layouts, there may be various ways to combine the data sources using the select query plan. For example, in terms of the data storage layouts, the data sources may be replicated across a cluster. Some data sources may be segmented by different hash keys, and different nodes may contain different data. Using the above example, there may be multiple ways to combine the source data into the final "Address" value. In one example, an intelligent engine may produce a step-by-step column refresh plan that is most likely to be computationally efficient. The column refresh plan may contain executable instructions to execute the refresh columns command on the target column(s). The column refresh plan may query the "Address" values from the source and may save these values as the new values into the "Customer" table.

The column refresh plan may need to take into account the storage layout of the target (i.e., the "Customer" table) defined by the storage layout metadata. The storage layout metadata may define how the raw data values are physically stored on the disk. In case of multiple columns being refreshed at the same time, the "best" column refresh plan may deal with multiple sources and multiple targets.

Figure 4:
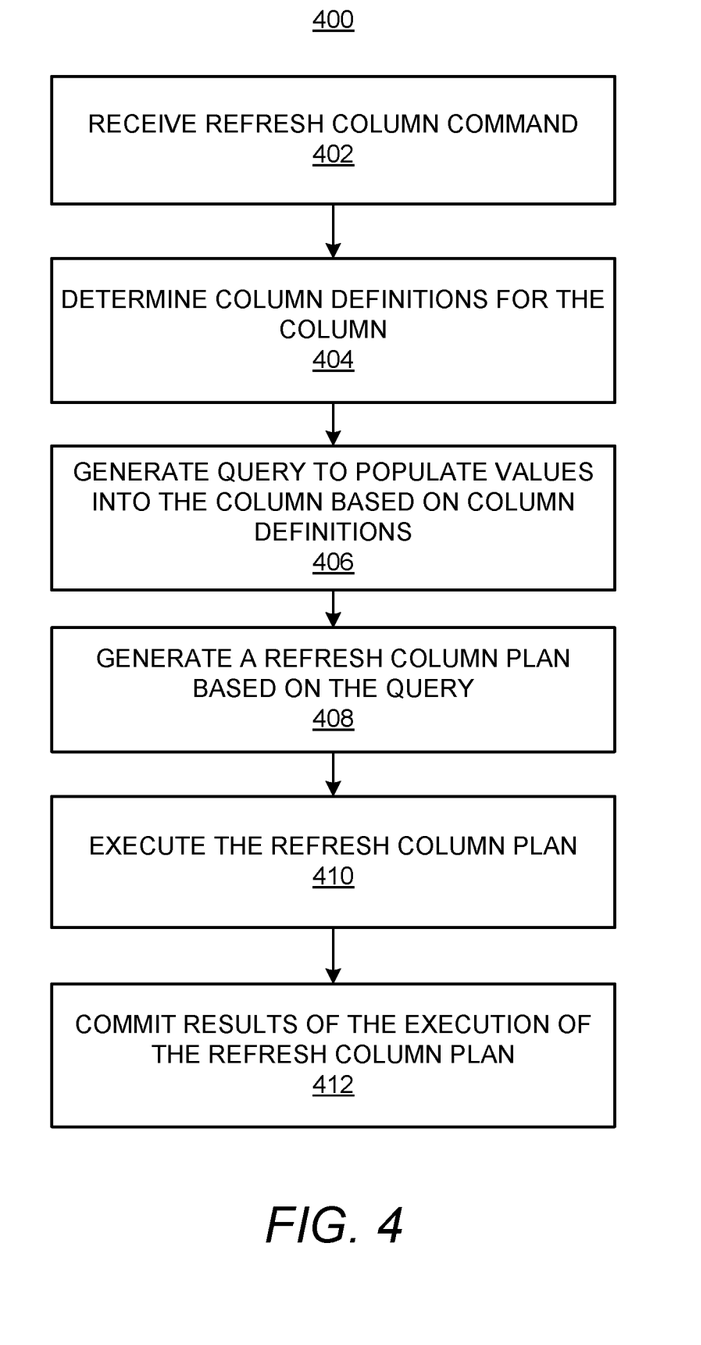
FIGS. 4-5 show example methods for column refresh via replacement.

Turning to FIG. 4, there is shown a flow diagram of example method 400 for executing column refresh-via-replacement procedure. The method 400 may be performed by the system described in FIGS. 1 and 3. At block 402, the processor 102 may execute the instructions to receive a refresh column command for a column-oriented database. The refresh column command may identify a table in the column-oriented database and a denormalized column in the table. At block 404, the processor 102 may execute the instructions to determine column definitions for the column. At block 406, the processor 102 may execute the instructions to generating a query to populate values from a data source associated with the column into the column based on the column definitions. At block 408, the processor 102 may execute the instructions to generate a refresh column plan based on the query. At block 410, the processor 102 may execute the instructions to execute the refresh column plan to replace an entire set of existing column values with the data source values. At block 412, the processor 102 may execute the instructions to commit results of the execution of the refresh column plan on the column.

Figure 5:
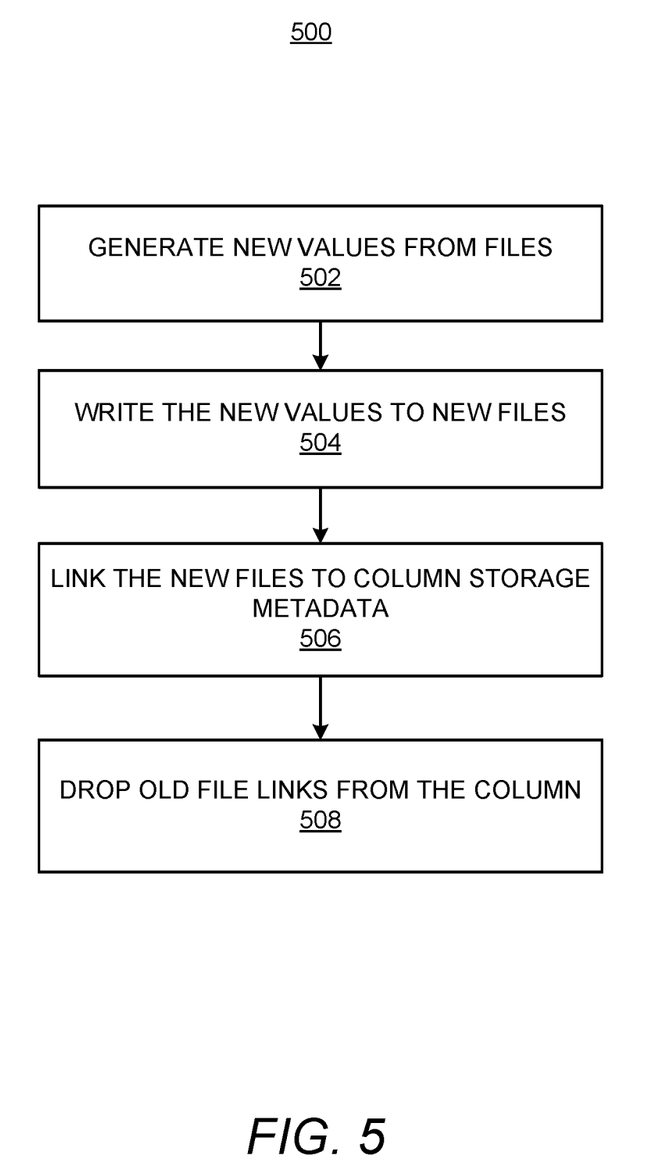

In FIG. 5, there is shown a flow diagram of example method 500 for executing column refresh-via-replacement procedure. At block 502, the processor 102 may execute the instructions to generate new values from data source files. At block 504, the processor 102 may execute the instructions to write the new values to new files. At block 506, the processor 102 may execute the instructions to link the new files to column storage metadata. At block 508, the processor 102 may execute the instructions to drop old file links from the column.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A system comprising:
   a processor;
   a memory on which is stored machine-readable instructions executable by the processor to:
   receive a refresh column command for a column-oriented database, the refresh column command identifying a table in the column-oriented database and a column in the table, wherein the column is denormalized as being not directly related to other columns via a primary key of the column-oriented database;
   determine column definitions for the column, the column definitions including a transformation to be performed on values from a data source prior to being stored in the column;

generate a query to populate the values from the data source into the column based on the column definitions;

generate, based on the query, a refresh column plan utilizing storage layout metadata of the column, the refresh column plan to keep an existing storage layout for the column and to write a column value stream with new values to a data source file associated with the column; and execute the refresh column plan on the column to replace an entire set of existing column values with the values from the data source, and to link the data source file associated with the column to the storage layout metadata of the column.

2. The system according to claim 1, wherein the instructions are further to cause the processor to generate a select query plan including the query based on storage layout metadata of tables to be read by the query.

3. The system according to claim 2, wherein the select query plan defines how the data source is scanned and how the data source is joined using a join function to produce the data source.

4. The system according to claim 2, wherein the instructions are further to cause the processor to convert the select query plan into the refresh column plan to be executed on the column.

5. The system according to claim 4, wherein the instructions are further to cause the processor to execute the refresh column plan to generate the new values and to write the column value stream with the new values to the data source file associated with the column.

6. The system according to claim 5, wherein to execute the refresh column plan, the instructions are further to cause the processor to:
drop old file links from the column.

7. The system according to claim 5, wherein the instructions are further to cause the processor to commit results of the executed refresh column plan.

8. The system according to claim 7, wherein the instructions are further to cause the processor to make a column storage metadata visible to future table queries in response to the committing the results of the executed refresh column plan.

9. The system according to claim 7, wherein the instructions are further to cause the processor to place old files referenced by old file links into a queue for removal in response to the committing the results of the executed refresh column plan.

10. The system according to claim 1, wherein the instructions are further to cause the processor to derive the column definitions from table metadata.

11. The system according to claim 1, wherein the instructions are further to cause the processor to receive a refresh columns command comprising column names of multiple denormalized columns of the table.

12. A computer-implemented method executable by at least one processor, the method comprising:
receiving a refresh column command for a column-oriented database, the refresh column command identifying a table in the column-oriented database and a column in the table, wherein the column is denormalized as being not directly related to other columns via a primary key of the column-oriented database;

determining column definitions for the column, the column definitions including a transformation to be performed on values from a data source prior to being stored in the column;

generating a query to populate the values from the data source into the column based on the column definitions;

generating, based on the query, a refresh column plan utilizing storage layout metadata of the column, the refresh column plan to keep an existing storage layout for the column and to write a column value stream with new values to a data source file associated with the column;

executing the refresh column plan to replace an entire set of existing column values with the values from the data source and to link the data source file associated with the column to the storage layout metadata of the column; and committing results of the executed refresh column plan.

13. The method according to claim 12, wherein the executing of the refresh column plan comprises:
generating the new values from data source files;
writing the new values to new files;
linking the new files to column storage metadata; and
dropping old file links from the column.

14. The method according to claim 13, further comprising writing the new values to the new files while keeping an existing storage layout of the column.

15. The method according to claim 12, further comprising generating a select query plan including the query based on the storage layout metadata of tables to be read by the query.

16. The method according to claim 15, wherein the select query plan defines how the data source is scanned and how the data source is joined using a join function to produce the data source.

17. The method according to claim 15, wherein the generating the refresh column plan is based on the select query plan.

18. The method according to claim 12, further comprising, in response to the committing of the results of the executed refresh column plan, making a column storage metadata visible to future table queries to read the values from the data source.

19. The method according to claim 12, further comprising receiving a refresh columns command comprising column names of multiple denormalized columns of the table.

20. A non-transitory computer readable medium on which is stored machine-readable instructions that when executed by a processor, cause the processor to:
receive a refresh column command for a column-oriented database, the refresh column command identifying a table in the column-oriented database and columns in the table, wherein the columns are denormalized as being not directly related to other columns via a primary key of the column-oriented database;

determine column definitions for the columns, the column definitions for the columns including a transformation to be performed on values from data sources prior to being stored in the columns;

generate a query to populate the values from the data sources into the columns based on the column definitions;

generate, based on the query, a refresh column plan utilizing storage layout metadata of the columns, the refresh column plan to keep an existing storage layout for the columns and to write column value streams with new values to data source files associated with the columns; and execute the refresh column plan on the column to replace an entire set of existing column values with the values from the data sources, and to link the data source files associated with the columns to the storage layout metadata of the columns.

\* \* \* \* \*